(12) United States Patent
Debruyn et al.

(10) Patent No.: US 12,482,347 B2
(45) Date of Patent: Nov. 25, 2025

(54) DIGITAL GEOSPATIAL BREADCRUMBS

(71) Applicant: Ford Global Technologies, LLC, Dearborn, MI (US)

(72) Inventors: Thomas Edward Debruyn, Minneapolis, MN (US); Taylor Hawley, Oak Park, MI (US)

(*) Notice: Subject to any disclaimer, the term of this patent is extended or adjusted under 35 U.S.C. 154(b) by 316 days.

(21) Appl. No.: 18/322,439

(22) Filed: May 23, 2023

(65) Prior Publication Data

US 2024/0395133 A1 Nov. 28, 2024

(51) Int. Cl.
*G08G 1/01* (2006.01)

(52) U.S. Cl.
CPC .................. *G08G 1/0112* (2013.01)

(58) Field of Classification Search
CPC .................................... G08G 1/0112
See application file for complete search history.

(56) References Cited

U.S. PATENT DOCUMENTS

| | | |
|---|---|---|
| 8,682,575 B2 | 3/2014 | Sakashita |
| 2016/0109254 A1 | 4/2016 | Rozman |
| 2020/0164844 A1* | 5/2020 | Jung .................. B60W 40/068 |
| 2021/0018918 A1 | 1/2021 | Levandowski et al. |
| 2021/0329448 A1* | 10/2021 | Gorman ............ H04W 12/0431 |
| 2022/0412759 A1 | 12/2022 | Neubecker et al. |
| 2024/0378998 A1* | 11/2024 | Xu ....................... G08G 1/0133 |
| 2025/0068960 A1* | 2/2025 | Yu ........................ G06N 20/00 |

OTHER PUBLICATIONS

English Translation of DE 102017223634 A1 Title: Determination Of A Road Condition By Evaluation Of Sensor Data Of A Road Vehicle Author: Leeb et al. Date: Jun. 13, 2019 (Year: 2019).*
Chaomin Luo et al., A Hybrid System for Multi-Goal Navigation and Map Building of an Autonomous Vehicle in Unknown Environments, IEEE International Conference on Robotics and biominetics (ROBIO), Dec. 12-14, 2013, pp. 1228-1233.
Ford, Ford's "Breadcrumbs" Feature.

* cited by examiner

*Primary Examiner* — James J Lee
*Assistant Examiner* — Steven Vu Nguyen
(74) *Attorney, Agent, or Firm* — Joseph Zane; Eversheds Sutherland (US) LLP (57) ABSTRACT

Systems and methods described herein allow vehicles in specific areas to create secure and encrypted breadcrumbs indicating paths along which they have traveled. The breadcrumbs may be created using sensor data from connected vehicle platforms. These breadcrumbs include information about the road surface, wheel traction, vehicle velocity, and observed event data using the platform's camera lenses and computer vision. Vehicles can record these breadcrumbs and assign a location to which the breadcrumbs should be mapped in the system.

17 Claims, 6 Drawing Sheets

DIGITAL GEOSPATIAL BREADCRUMBS

BACKGROUND

Travelers who are unfamiliar with a specific location want to be smart and safe about the path they travel between two points. There are many circumstances in which road conditions can change suddenly. As a first example, in urban environments, there may be sudden influx of traffic when a concert or sporting event ends. As a second example, in rural environments, a driver may wish to know the present road conditions if there has been a recent snow storm-whether certain roads have been plowed, whether the roads are icy, etc. Accordingly, there is a present need for drivers to make better decisions regarding how to minimize delays, or select pathways that bypass poor road conditions.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed to systems and methods for digital geospatial breadcrumbs. Systems and methods described herein allow vehicles in specific areas to create secure and encrypted breadcrumbs indicating paths along which they have traveled. The breadcrumbs may be created using sensor data from connected vehicle platforms. These breadcrumbs include information about the road surface, wheel traction, vehicle velocity, and observed event data using the platform's camera lenses and computer vision. Vehicles can record these breadcrumbs and assign a location to which the breadcrumbs should be mapped in the system. The location may be identified by coordinates, which may be determined using any suitable means, such as a global positioning satellite (GPS) system, quantum-based accelerometer, inertial navigation system, etc. Encoded in the token may be information about the traffic level, road surface conditions, and the time the information was recorded. The tokens may expire as they become stale. The breadcrumbs can be broadcasted using a decentralized, short-range wireless network that does not require the vehicle to have access to the Internet. Breadcrumbs can be picked up and interpreted by other vehicles that cross through an area close to the coordinate assigned to the token. The system ingests, understands, and de-identifies in aggregate the collected tokens to teach the system to communicate navigation options. The system may operate both in real-time and predictively using artificial intelligence and machine learning. In various embodiments, the system provides information regarding local crime statistics, pedestrian and bicyclist activity levels, road construction, and roadway accident data. These factors combine to provide drivers with enhanced route options.

Figure 1:
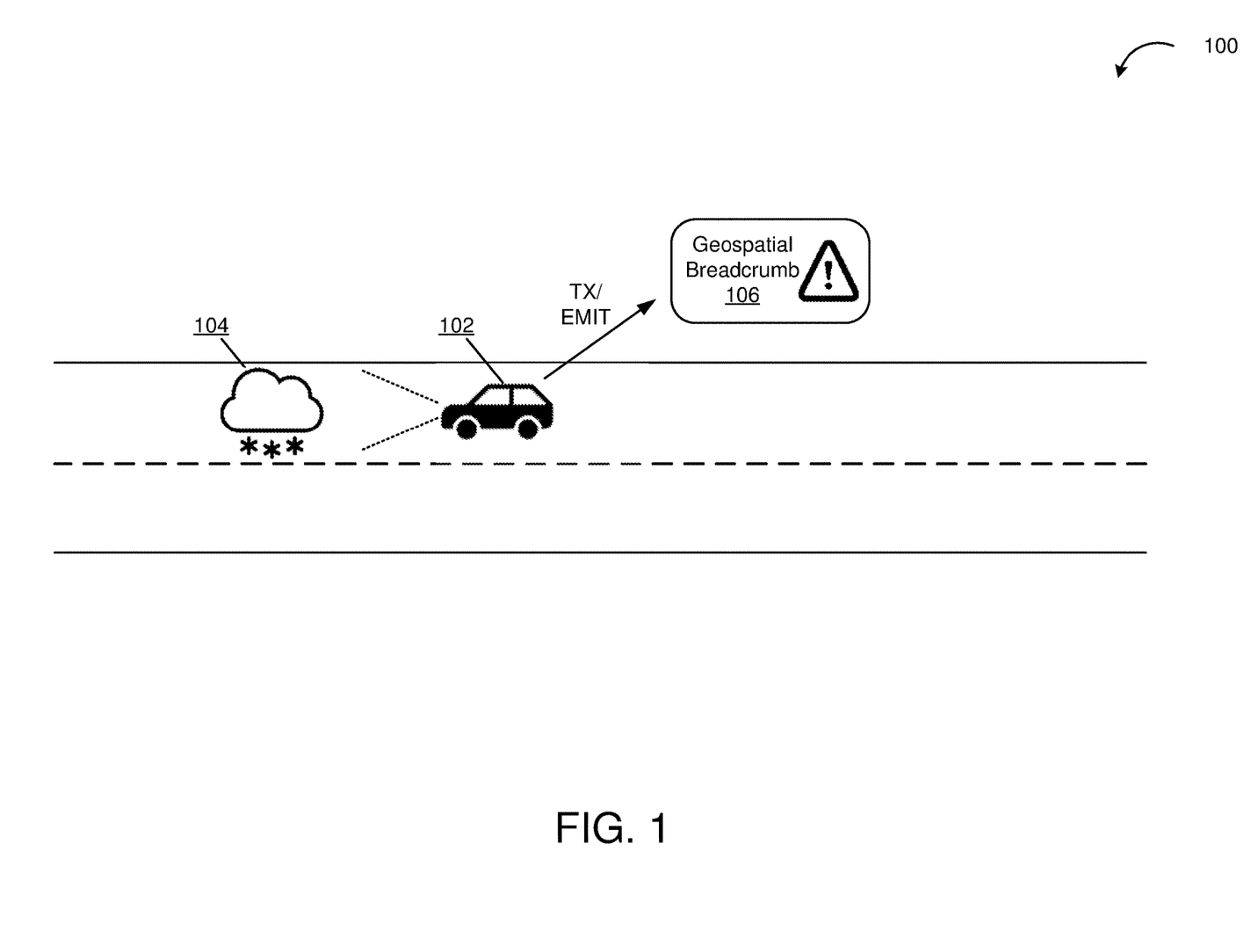
FIG. 1 depicts an illustrative environment in which a vehicle dropping digital geospatial breadcrumbs may be implemented, in accordance with at least one embodiment of the present disclosure.

FIG. 1 depicts an illustrative environment 100 in which a vehicle dropping digital geospatial breadcrumbs may be implemented, in accordance with at least one embodiment of the present disclosure. A digital geospatial breadcrumb dropped by vehicle in FIG. 1 may be later picked up by another vehicle in FIG. 2.

Vehicle 102 may comprise various sensors for collecting, processing, and distributing digital geospatial breadcrumbs. In various embodiments, vehicle 102 collects sensor data related to road conditions, such as sensor data regarding road surface, wheel traction, vehicle velocity, and observed event data. Sensor data can be categorized using artificial intelligence (AI) and machine learning (ML) techniques to a predefined set of categorizations. For example, the vehicle's on-board sensors may include cameras that capture video or image footage that is processed using AI/ML to determine a road condition such as potholes, icy roads, a fallen tree, or other conditions that may be important for vehicle operators to be aware of. ML-based computer vision algorithms may be run locally on a computing unit of the vehicle 102 or off-loaded to a remote server that may have additional compute capabilities for detecting and categorizing potential anomalies or relevant road conditions. As an example, FIG. 1 depicts an example in which a road condition 104 is detected by the vehicle platform's camera lenses and using computer vision. The road condition 104 may be identified as an icy patch, and information regarding the condition may be recorded, such as coordinates of the icy patch, image or video of the icy patch in relation to the surrounding environment, wheel traction, vehicle velocity, and so on and so forth.

A digital geospatial breadcrumb 106 may comprise information about the road surface, wheel traction, vehicle velocity and observed event data using the platform's camera lenses and computer vision. In various embodiments, geospatial breadcrumb 106 includes a timestamp and/or time-to-live (TTL) expiration. A geospatial breadcrumb 106 may be considered expired if it is picked up and processed after the TTL expiry, and may simply be discarded in such cases. Geospatial breadcrumb 106 can be assign a location where they should be mapped in the system. The location may simply be the location of the vehicle when a road condition was detected, a measured location of the road condition, or other such appropriate locations. For example, if vehicle 102 drives through a densely wooded area and encounters a deer crossing the road from north-to-south, a digital geospatial breadcrumb may be generated with a coordinate, such as a GPS coordinate, that is to the north of the roadway traversed by the vehicle, from where the deer was initially spotted, rather than the coordinates of the vehicle itself on the road. The digital geospatial breadcrumb may be emitted near the encounter and if another vehicle picks up this geospatial breadcrumb in close temporal proximity, the vehicle and/or driver can be alerted to the potential of additional deer crossing from the north. In various embodiments, the vehicle may pick up this digital geospatial breadcrumb and perform a prophylactic measure, such as to focus a camera on the geolocation identified by the breadcrumb and monitor for additional deer crossing that a driver should be alerted to. In some embodiments, an augmented reality (AR)-based heads up display of a vehicle will provide a visual indicator to the vehicle of possible deer crossings from north-to-south that can help the driver to be more cautious while driving through that area.

In various embodiments, the process of dropping a geospatial breadcrumb is programmatically automated, and the vehicle's onboard systems would perform the process steps to collect sensor data, process sensor data, generate geospatial breadcrumbs, and emit the geospatial breadcrumbs in real-time vehicle. In some embodiments, vehicle 102 generates a digital geospatial breadcrumb 106 in response to the detected road condition 104. In some embodiments, geospatial breadcrumbs are periodically emitted by vehicle 102 regardless of whether any specific road conditions are detected. However, in other embodiments, vehicle 102 emits geospatial breadcrumbs responsive in response to collecting sensor data and detecting the presence of an abnormal or anomalous road condition. In this way, vehicles that pick up geospatial breadcrumbs are made aware of the potential presence of a nearby, potentially hazardous condition and may prioritize the processing and presentation of the digital geospatial breadcrumb when they are detected.

Figure 2:
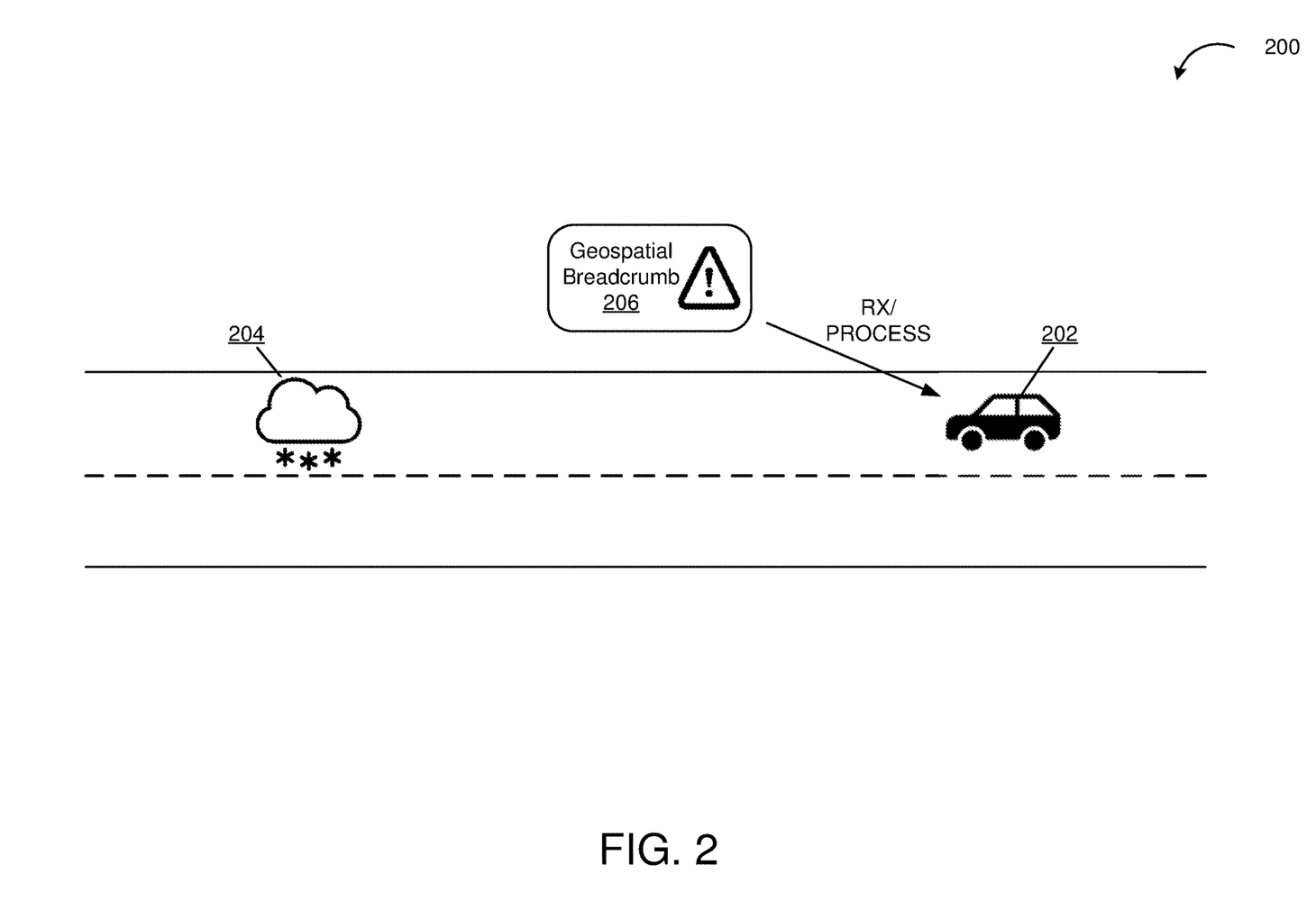
FIG. 2 depicts an illustrative environment in which a vehicle picking up digital geospatial breadcrumbs may be implemented, in accordance with at least one embodiment of the present disclosure.

FIG. 2 depicts an illustrative environment 200 in which a vehicle picking up digital geospatial breadcrumbs may be implemented, in accordance with at least one embodiment of the present disclosure. A digital geospatial breadcrumb dropped by vehicle in FIG. 1 may be later picked up by another vehicle in FIG. 2.

In various embodiments, vehicle 202 travels on a roadway and detects the presence of a digital geospatial breadcrumb 206. The geospatial breadcrumb 206 may have been previously dropped by another vehicle that previously detected a road condition 204 that vehicle 202 has not yet encountered. Vehicle 202 may be too far to see the road condition yet, or the condition may be around a blind turn or otherwise obstructed-digital geospatial breadcrumb 206 may, therefore, provide vehicle 202 with an early notification of a potential road condition and allow for vehicle 202 to make adjustments based on information that the vehicle would not otherwise be aware of.

Digital geospatial breadcrumb 206 may be received or otherwise obtained by vehicle 202 in any suitable manner. In some embodiments, vehicle 202 receives digital geospatial breadcrumbs from a cloud service via an Internet connection or from an edge server, for example, as described in connection with FIG. 3. In some embodiments, a decentralized vehicle-to-vehicle communications mechanism may involve a first vehicle generating digital geospatial breadcrumb 206 and a connected vehicle platform thereof would store it locally and broadcast it over a short-range wireless network, such as Bluetooth or WiFi, to other nearby vehicles such as vehicle 202, for example, as described in connection with FIG. 4.

When vehicle 202 picks up, receives, obtains, or otherwise determines digital geospatial breadcrumb 206, the vehicle—or a processing unit thereof—will process the data. In accordance with at least one embodiment, the geospatial breadcrumb 206 is received in an encrypted format and is decrypted by the receiving vehicle. Data is extracted from the geospatial breadcrumb 206 and may include information about the traffic level, road surface condition, and the time the information was recorded.

In various embodiments, vehicle 202 collects and analyzes breadcrumb data from multiple vehicles over time and is able to determine road conditions. In some embodiments, the system is able to understand the best options for navigation between two points in real-time and predictively, incorporating data such as local crime statistics, pedestrian and bicyclist activity levels, road construction and roadway accident data. In some cases, a geospatial breadcrumb 206 is discarded if the data is too old (e.g., expired) or superseded by another geospatial breadcrumb. For example, a first geospatial breadcrumb at time t1 may indicate that there is delay ahead due to a car accident being cleared, but a second geospatial breadcrumb at t2>t1 may indicate that the accident has been cleared and traffic is following again. As a second example, digital geospatial breadcrumbs can be used to detect spikes in traffic (e.g., when a sporting event or concert has ended) and also to signal when the traffic has cleared. This type of signaling can be performed in real-time and assist in directing a vehicle on a path that avoids a sudden build up in traffic.

Figure 3:
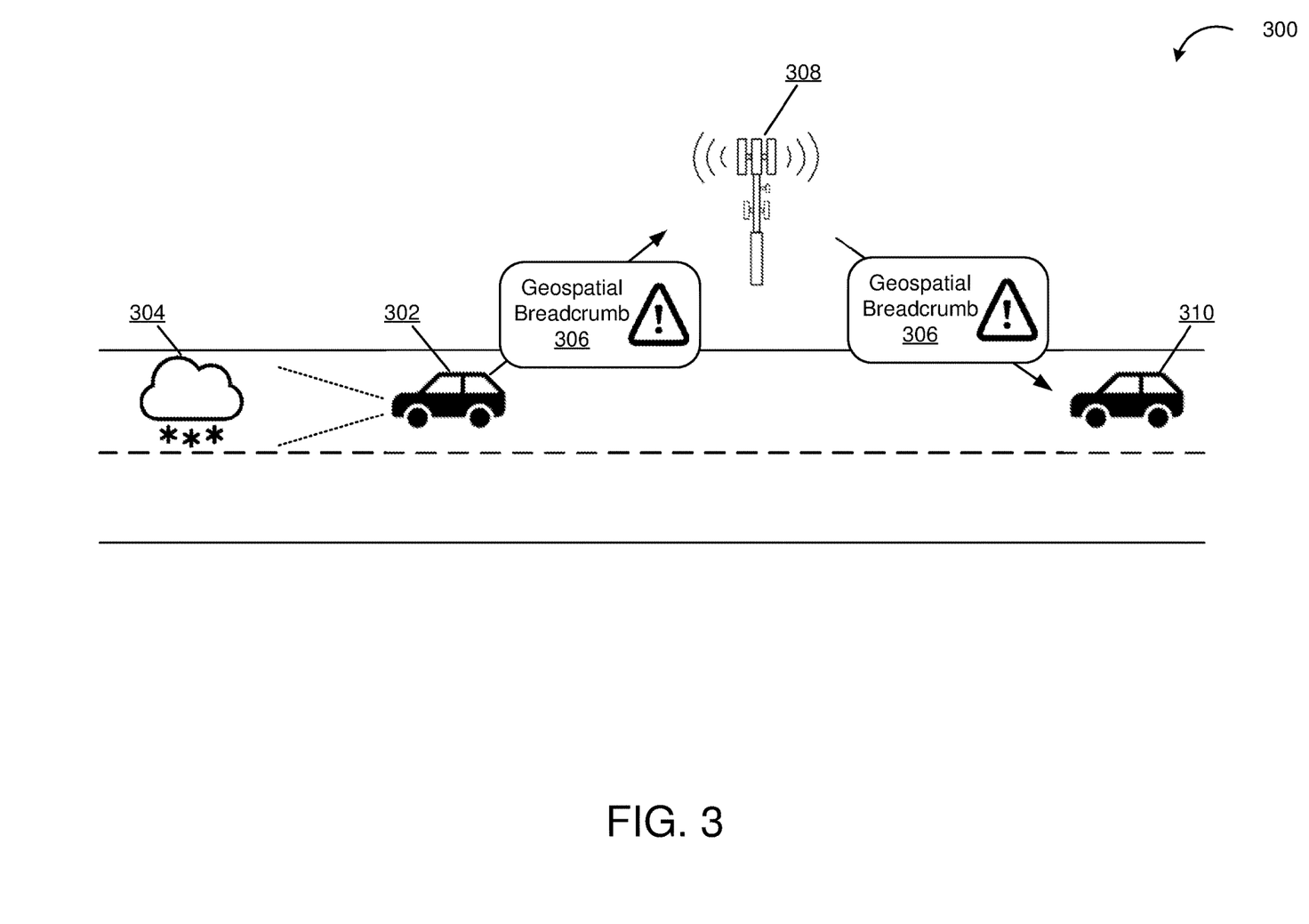
FIG. 3 depicts an illustrative environment in which networking infrastructure is utilized to distribute digital geospatial breadcrumbs, in accordance with at least one embodiment of the present disclosure.

FIG. 3 depicts an illustrative environment 300 in which networking infrastructure is utilized to distribute digital geospatial breadcrumbs, in accordance with at least one embodiment of the present disclosure.

Vehicle 302 may comprise various sensors for collecting, processing, and distributing digital geospatial breadcrumbs. In various embodiments, vehicle 302 collects sensor data related to road condition 304 and generates a digital geospatial breadcrumb 306 that is transmitted to network infrastructure 308 that is able to distribute the geospatial breadcrumb 306 to other vehicles in the area, such as vehicle 310. In various embodiments, vehicles transmit information in the form of basic safety messages (BSMs) to an edge computing server and provides the edge computing resources with information regarding the location and direction of the vehicle. The BSMs may be used to determine whether geospatial breadcrumb 306 is relevant to a particular vehicle. For example, geospatial breadcrumb 306 may be relevant to vehicle 310 because it is traveling in a direction that indicates vehicle 310 is likely to encounter the same road condition 304. If, for example, the road condition is an icy patch covers only one side of the road, vehicles traveling in the other direction from vehicle 302 and vehicle 310 may not receive geospatial breadcrumb 306. However, if the geospatial breadcrumb 306 indicates that the icy patch covers the entire road, then vehicles traveling in both direction may receive geospatial breadcrumb 306 alerting them of the road condition.

In various embodiments, network infrastructure 308 utilizes multi-access edge computing (MEC) technology. A MEC server may include computing and storage resources placed closer to end-users, thereby reducing latency, enhancing application performance, and user experience. A MEC server may be typically deployed at the edge of the network, which is the part of the network that is closest to the end-users. In some embodiments, a remote cloud server is utilized to distribute geospatial breadcrumb 306.

In various embodiments, geospatial breadcrumbs can be aggregated and analyzed to provide awareness of patterns that can benefit vehicles by providing greater insight into predicted or inferred patterns. Transitory anomalies such as wildlife sightings in the roadway may later be aggregated by the centralized processor such that the system can provide up-to-date labeling of wildlife crossing road sections based on data from geospatial breadcrumbs. This data gives the system awareness of seasonal migration periods and population behavior changes for the safety of vehicle passengers. For example, consider an example in which several vehicles in an off-road environment encounter wildlife. In this example, different vehicles may emit digital geospatial breadcrumbs upon each wildlife encounter that includes timestamps, coordinates (e.g., GPS coordinates), and headings for various types of wildlife that are spotted (e.g., a herd of lions, a flock of rare birds, and so on). The geospatial breadcrumbs may be collected by a central server (e.g., a MEC server or a remote cloud server) to predict the expected movement of the wildlife. The expected movements may be used to identify other vehicles in the area that may be in range of the expected future location of the wildlife and the server may transmit the expected migration patterns of the wildlife so that those vehicles have the option to navigate towards the expected location of the wildlife, if they so desire.

As a second example, digital geospatial breadcrumbs can be emitted by vehicles in a dense urban environment—for example, following a sporting event or concert—that encodes the traffic conditions observed by the vehicle. A MEC server or remote cloud server may aggregate geospatial digital breadcrumbs from several vehicles to determine the expected traffic pattern for the surrounding area and provide navigation directions to other vehicles to bypass the anticipated traffic patterns. For example, artificial intelligence and/or machine learning (ML) models may be used to process an aggregated set of digital geospatial breadcrumbs to predict the future movement of vehicles in an urban environment as they disperse from a venue. Other nearby vehicles may receive navigation paths to bypass predicted traffic queues based on the location, density, and movement of vehicles based on the digital geospatial breadcrumbs they emit.

In some embodiments, geospatial breadcrumb 306 is encrypted and/or anonymized. For example, in some embodiments, geospatial breadcrumb 306 may be encrypted and shared only with authorized parties, for example, only with law enforcement. In some embodiments, geospatial breadcrumbs are anonymized and de-identified by removing information such as VIN numbers or other identifiers that might be used to trace the location or whereabouts of an individual. In some embodiments, the anonymization occurs after the MEC server receives a geospatial breadcrumb and prior to distribution. In this way, the MEC server may receive a geospatial breadcrumb, determine a de-identified version of the geospatial breadcrumb and transmit the de-identified version of the geospatial breadcrumb to nearby vehicles.

Figure 4:
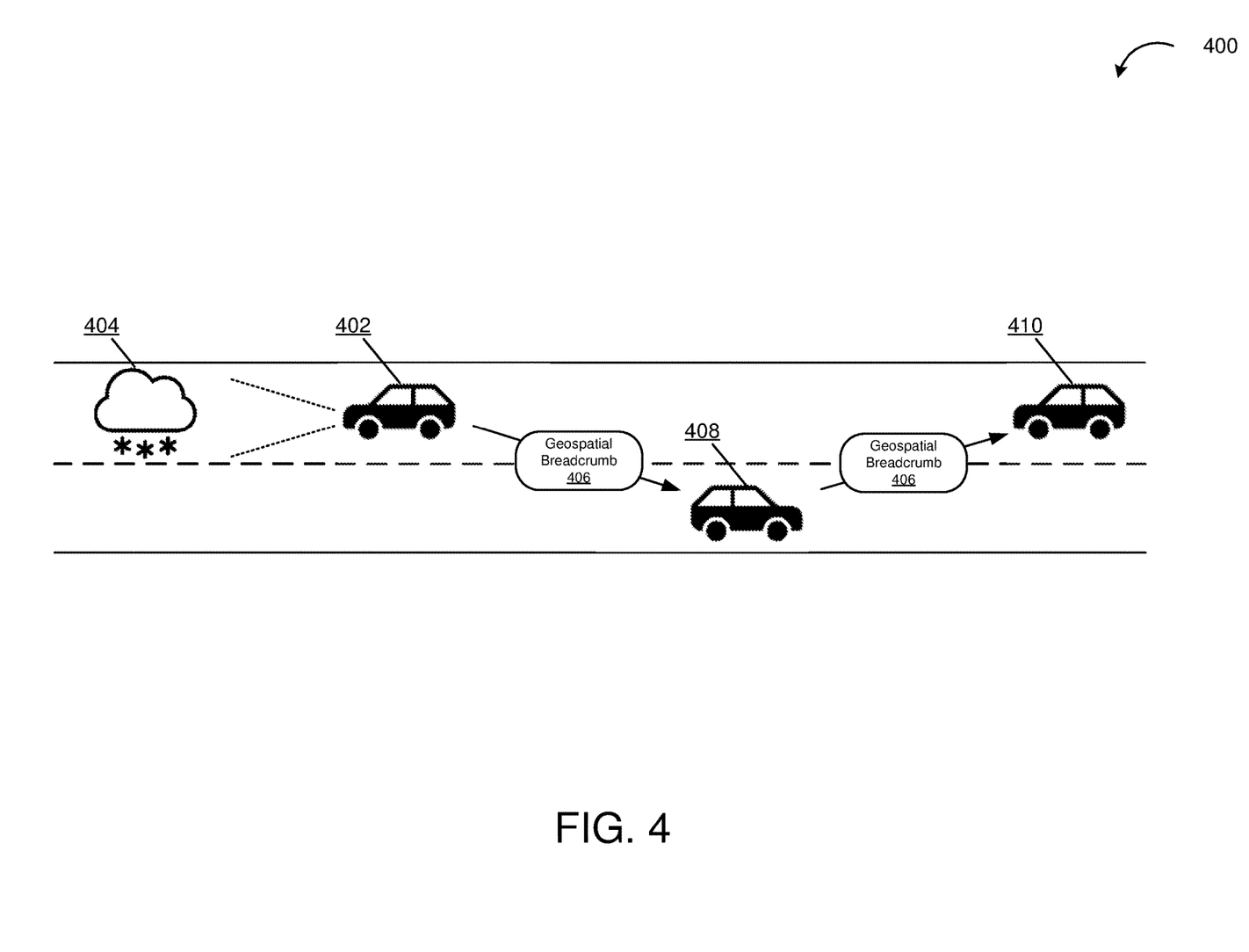
FIG. 4 depicts an illustrative environment of a decentralized, vehicle-to-vehicle network for distributing digital geospatial breadcrumbs, in accordance with at least one embodiment of the present disclosure.

FIG. 4 depicts an illustrative environment 400 of a decentralized, vehicle-to-vehicle network for distributing digital geospatial breadcrumbs, in accordance with at least one embodiment of the present disclosure.

In at least one embodiment, digital geospatial breadcrumbs are distributed in a decentralized manner through vehicle-to-vehicle communications. A benefit of this architecture is that it can be performed without access to centralized networks, meaning that even if the vehicles are in an area without access to the Internet such as on a mountain road, they can still emit and receive digital geospatial breadcrumbs and distribute information regarding potentially hazardous road conditions.

Vehicle 402 may detect a road condition 404 and generate a geospatial breadcrumb 406, for example, using techniques described above. The geospatial breadcrumb 406 may be distributed over a decentralized network in which each connected vehicle platform functions as a node in a decentralized network, sharing and receiving geospatial breadcrumb data with other nearby vehicles using vehicle-to-vehicle (V2V) or other communications means. In various embodiments, vehicles use a vehicle-to-everything (V2X) communications module to emit digital geospatial breadcrumbs to other nearby vehicles, infrastructure, or other devices. These devices may have the ability to use near field communications or other short range networks to receive the geospatial breadcrumb, store it, and share it with other vehicles that subsequently enter range of the device. For example, a distributed V2V network may be formed by vehicle 402, vehicle 408, and vehicle 410.

As depicted in FIG. 4, vehicle 402 may emit geospatial breadcrumb 406 which is received by vehicle 408 as they pass by each other. Vehicle 408 may effectively act as a relay by emitting geospatial breadcrumb 406 when it passes vehicle 410. This allows for the geospatial breadcrumb 406 to be distributed to a wider area than can be covered solely by vehicle 402 using direct means. For example, even if vehicle 402 and vehicle 410 are too far away to communicate with each other directly (e.g., out of range of V2V or V2X communications), vehicle 402 nevertheless can send geospatial breadcrumb 406 to vehicle 408 when they pass each other, and when vehicle 408 passes vehicle 410, geospatial breadcrumb 406 can then be passed to vehicle 410.

In various embodiments, geospatial breadcrumb 406 is encrypted using a manufacturer's cryptographic secret that known to other vehicles or devices by the same manufacturer, but can be distributed by other devices that are not necessarily able to decrypt the geospatial breadcrumb 406. The system would be more secure since data would be stored locally and not transmitted over a cloud-based network, which may reduce the risk of data breaches or other cyber threats. Additionally, this design would work even in areas where internet connectivity is poor or non-existent, since the vehicles would not need to rely on cloud-based services for data storage or processing. However, this design would require more computing power and memory on each connected vehicle platform to handle the local processing and storage of breadcrumb data. Other techniques described in this disclosure may be applied in the context of a centralized node network, such as anonymization and de-identifying techniques described above. These techniques may be particularly important in the context of a decentralized network in which devices owned by other individuals or entities may control the lifetime and storage of geospatial breadcrumb 406.

Figure 5:
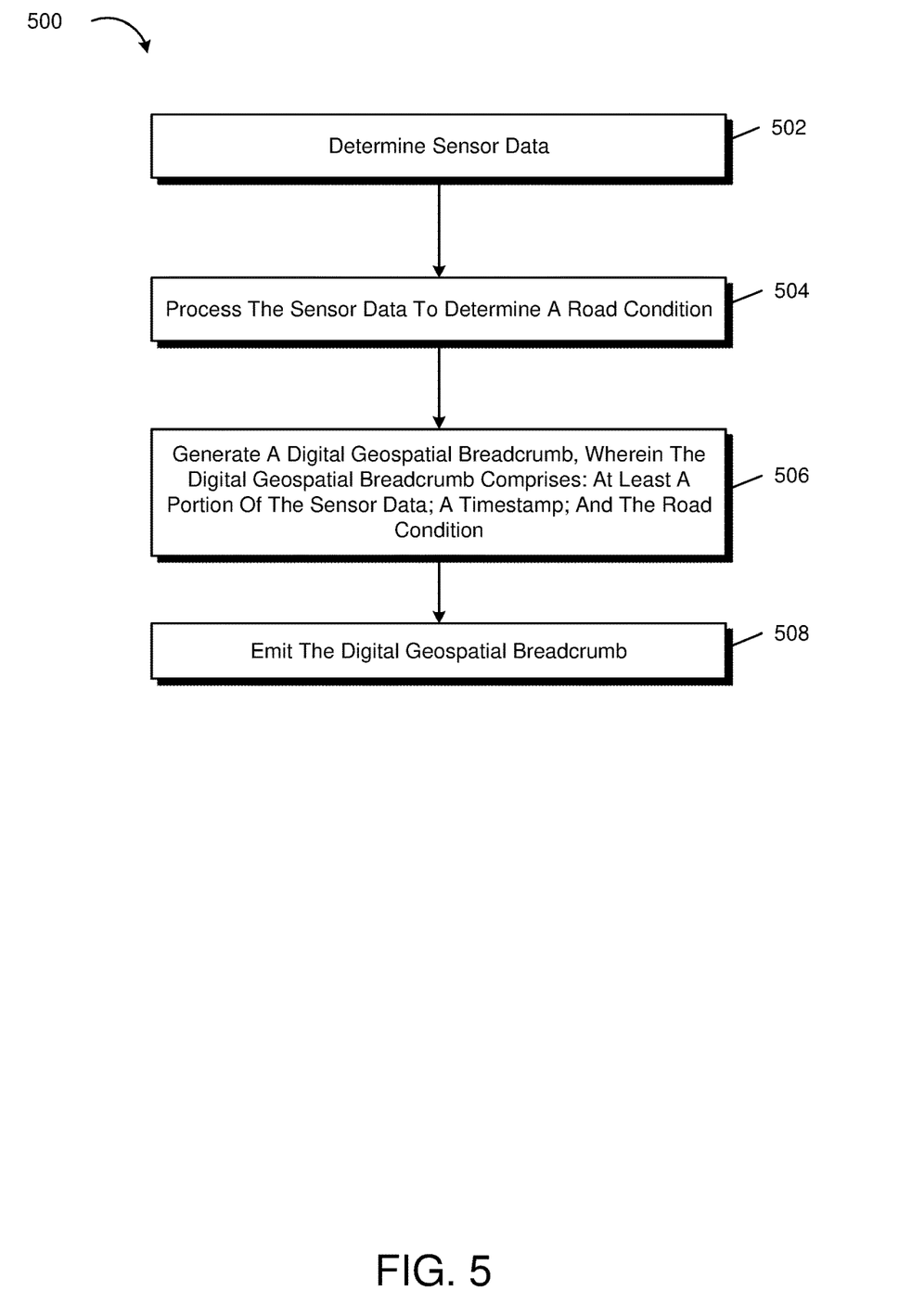
FIG. 5 shows an illustrative example of a process for utilizing digital geospatial breadcrumbs, in accordance with one or more example embodiments of the present disclosure.

FIG. 5 shows an illustrative example of a process 500 for utilizing digital geospatial breadcrumbs, in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 1-4. In at least one embodiment, process 500 or a portion thereof is collectively implemented by a controller system of a vehicle. In various embodiments, steps of process 500 and/or other processes are performed by a vehicle will utilize the controller system.

In various embodiments, process 500 comprises a step 502 to determine sensor data. The sensor data may comprise road surface, wheel traction, vehicle velocity, or a combination thereof. The sensor data may be collected using various on-board sensors of the vehicle, such as camera lenses and computer vision.

In various embodiments, process 500 comprises a step 504 to analyze the sensor data and determine a road condition. The sensor data may be analyzed using artificial intelligence (AI) and machine learning (ML) techniques to determine whether the sensor data indicates a road condition is present. The possible road condition may be from a predefined set of categorizations. For example, the vehicle's on-board sensors may include cameras that capture video or image footage that is processed using AI/ML to determine a road condition such as potholes, icy roads, a fallen tree, or other conditions that may be important for vehicle operators to be aware of. ML-based computer vision algorithms may be run locally on a computing unit of the vehicle or off-loaded to a remote server that may have additional compute capabilities for detecting and categorizing potential anomalies or relevant road conditions.

In various embodiments, process 500 comprises a step 506 to generate or otherwise determine a digital geospatial breadcrumb. In various embodiments, the digital geospatial breadcrumb comprises at least a portion of the sensor data, a timestamp, and the determined road condition. In various embodiments, the digital geospatial breadcrumb encodes coordinates (e.g., GPS coordinates), driving direction, or other information relevant to the condition. For example, the geospatial breadcrumb may encode that the vehicle encountered an icy snow patch. The coordinates may be the location of the detected condition, the location of the vehicle when the condition was detected, or another location that is more relevant for recipients to know about.

In various embodiments, process 500 comprises a step 508 to emit the digital geospatial breadcrumb. A vehicle may drop or emit a digital geospatial breadcrumb using a variety of techniques. In some embodiments, a geospatial breadcrumb is dropped using edge computing resources that retain the geospatial breadcrumb and allow it to be picked up later by another vehicle.

In various embodiments, a second vehicle picks up or otherwise obtains the digital geospatial breadcrumb at a later time. The second vehicle may process the digital geospatial breadcrumb to determine whether the digital geospatial breadcrumb is relevant to the second vehicle. Whether a geospatial breadcrumb is relevant to a vehicle may depend on various information such as the direction that the vehicle is driving, comparing the information of the breadcrumb to other breadcrumbs that the vehicle as picked up, and so on. For example, a first geospatial breadcrumb at time t1 may indicate that there is delay ahead due to a car accident being cleared, but a second geospatial breadcrumb at t2>t1 may indicate that the accident has been cleared and traffic is following again. In this case, the first geospatial breadcrumb that was recorded at time t1 (but perhaps picked up after the second breadcrumb) may be discarded as irrelevant, outdated, or otherwise superseded by another digital breadcrumb. In response to determining that the digital geospatial breadcrumb is relevant, a vehicle operator may be provided an indication of the road condition, for example, through a visual or audio indicator.

In various embodiments, digital geospatial breadcrumbs are distributed in a decentralized manner through vehicle-to-vehicle communications. A third vehicle may pick up a digital geospatial breadcrumb from a first vehicle using vehicle-to-vehicle (V2V) communications and the third vehicle can provide the digital geospatial breadcrumb to a second vehicle that is otherwise outside of the range to communicate directly with the first vehicle.

In various embodiments, the data from the sensors may comprises at least one of road surface condition, wheel traction, or vehicle velocity.

In various embodiments, the geospatial breadcrumb is encrypted and/or anonymized. For example, in some embodiments, the geospatial breadcrumb may be encrypted and shared only with authorized parties, for example, only with law enforcement. In some embodiments, geospatial breadcrumbs are anonymized and de-identified by removing information such as VIN numbers or other identifiers that might be used to trace the location or whereabouts of an individual. In some embodiments, the anonymization occurs after a remote server receives a geospatial breadcrumb and prior to distribution. In this way, the remote server may receive a geospatial breadcrumb, determine a de-identified version of the geospatial breadcrumb and transmit the de-identified version of the geospatial breadcrumb to nearby vehicles. In various embodiments, the vehicle encrypts the digital geospatial breadcrumb directly.

In various embodiments, artificial intelligence and machine learning is used to categorize the sensor data according to a predefined set of categorizations.

In various embodiments, emitting the digital geospatial breadcrumb comprises transmitting the digital geospatial breadcrumb to a remote server.

In various embodiments, the digital geospatial breadcrumb comprises coordinates of the road condition.

Figure 6:
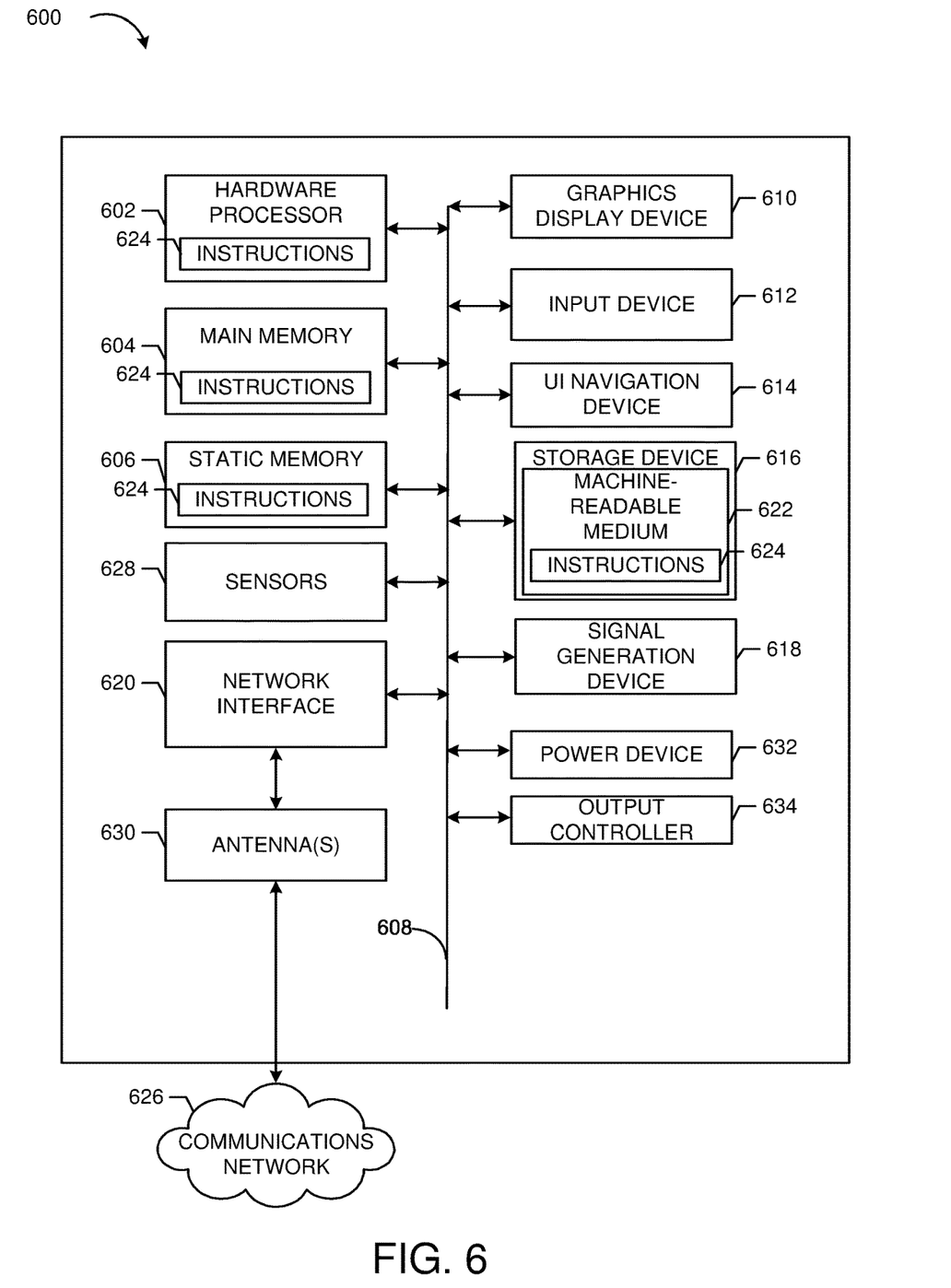
FIG. 6 illustrates a block diagram of an example of a machine or system upon which any one or more of the techniques (e.g., methodologies) discussed herein may be performed.

FIG. 6 illustrates a block diagram of an example of a machine 600 or system upon which any one or more of the techniques (e.g., methodologies) discussed herein may be performed. The machine (e.g., computer system) 600 may include any combination of the illustrated components. For example, the machine 600 may include a hardware processor 602 (e.g., a central processing unit (CPU), a graphics processing unit (GPU), a tensor processing unit (TPU) including an artificial intelligence application-specific integrated circuit (ASIC), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a data signal), a network interface device/transceiver 620 coupled to antenna(s) 630, and one or more sensors 628, such as a sound detecting sensor (e.g., a microphone), accelerometers, magnetometers, location sensors, and the like. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media. In various embodiments, a vehicle's controller system is implemented using one or more machines (e.g., machine 600).

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, any suitable geopositioning system that can determine location coordinates, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
    determining, by one or more processors of a vehicle, sensor data;
    processing, by the one or more processors, the sensor data to determine a road condition;
    determining, by the one or more processors, a digital geospatial breadcrumb, wherein the digital geospatial breadcrumb comprises:
        at least a portion of the sensor data;
        a timestamp; and
        the road condition;
    emitting, by the one or more processors, the digital geospatial breadcrumb;
    obtaining, by second one or more processors of a second vehicle, the digital geospatial breadcrumb;
    processing, by the second one or more processors, the digital geospatial breadcrumb to determine whether the digital geospatial breadcrumb is relevant to the second vehicle;
    in response to determining that the digital geospatial breadcrumb is relevant, providing an indication of the road condition;
    obtaining, by the second one or more processors, a second digital geospatial breadcrumb with a second timestamp;
    determining, by the second one or more processors, that the digital geospatial breadcrumb supersedes the second digital geospatial breadcrumb based at least in part on comparing the timestamp with the second timestamp; and
    automatically performing, by the second vehicle, an action based on the second digital geospatial breadcrumb.

2. The method of claim 1, wherein:
    a third vehicle picks up the digital geospatial breadcrumb from the vehicle using vehicle-to-vehicle (V2V) communications; and
    the third vehicle provides the digital geospatial breadcrumb to the second vehicle.

3. The method of claim 1, wherein the sensor data comprises at least one of road surface condition, wheel traction, or vehicle velocity.

4. The method of claim 1, wherein determining the digital geospatial breadcrumb further comprises anonymizing or de-identifying the sensor data.

5. The method of claim 1, further comprising encrypting, by the one or more processors, the digital geospatial breadcrumb.

6. The method of claim 1, further comprising using artificial intelligence and machine learning to categorize the sensor data according to a predefined set of categorizations.

7. The method of claim 1, wherein emitting the digital geospatial breadcrumb comprises transmitting the digital geospatial breadcrumb to a remote server.

8. The method of claim 1, wherein the digital geospatial breadcrumb comprises coordinates of the road condition.

9. The method of claim 1, wherein automatically performing the action further comprises providing, by the second vehicle, a visual indication via an augmented reality-based heads up display.

10. A vehicle, comprising:
one or more sensors; and
a controller unit, comprising one or more processors and memory storing executable instructions that, as a result of being executed by the one or more processors, cause the vehicle to at least:
collect sensor data from the one or more sensors;
process the sensor data to determine a road condition;
determine a digital geospatial breadcrumb, wherein the digital geospatial breadcrumb comprises:
at least a portion of the sensor data;
a timestamp; and
the road condition;
emit the digital geospatial breadcrumb;
obtain a second digital geospatial breadcrumb dropped by a second vehicle, the second digital geospatial breadcrumb comprising at least a second timestamp and a second road condition, wherein the vehicle obtains the second digital geospatial breadcrumb from a third vehicle using vehicle-to-vehicle (V2V) communications;
process the second digital geospatial breadcrumb to determine whether the second digital geospatial breadcrumb is relevant to the vehicle;
in response to determining that the second digital geospatial breadcrumb is relevant, providing an indication of the second road condition; and
automatically perform, by the second vehicle, an action based on the second digital geospatial breadcrumb.

11. The vehicle of claim 10, wherein the executable instructions, as a result of execution, cause the vehicle to further:
obtain a third digital geospatial breadcrumb with a third timestamp; and
determine that the third digital geospatial breadcrumb supersedes the second digital geospatial breadcrumb based at least in part on comparing the third timestamp with the second timestamp.

12. The vehicle of claim 10, wherein the sensor data comprises at least one of road surface condition, wheel traction, or vehicle velocity.

13. The vehicle of claim 10, wherein determining the digital geospatial breadcrumb further comprises anonymizing or de-identifying the sensor data.

14. The vehicle of claim 10, wherein the executable instructions, as a result of execution, cause the vehicle to further encrypt the digital geospatial breadcrumb.

15. The vehicle of claim 10, wherein the executable instructions, as a result of execution, cause the vehicle to further use artificial intelligence and machine learning to categorize the sensor data according to a predefined set of categorizations.

16. The vehicle of claim 10, wherein emitting the digital geospatial breadcrumb comprises transmitting the digital geospatial breadcrumb to a remote server.

17. The vehicle of claim 10, wherein the digital geospatial breadcrumb comprises coordinates of the road condition.

* * * * *